(12) United States Patent
Amores-Llopis et al.

(10) Patent No.: US 10,095,315 B2
(45) Date of Patent: Oct. 9, 2018

(54) SYSTEM AND METHOD FOR DISTANT GESTURE-BASED CONTROL USING A NETWORK OF SENSORS ACROSS THE BUILDING

(71) Applicant: Otis Elevator Company, Farmington, CT (US)

(72) Inventors: Jaume Amores-Llopis, Cork (IE); Alan Matthew Finn, Hebron, CT (US); Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 90 days.

(21) Appl. No.: 15/241,735

(22) Filed: Aug. 19, 2016

(65) Prior Publication Data
US 2018/0052519 A1  Feb. 22, 2018

(51) Int. Cl.
| | |
|---|---|
| B66B 1/46 | (2006.01) |
| G06F 3/01 | (2006.01) |
| H04L 29/08 | (2006.01) |
| G05B 15/02 | (2006.01) |
| G06F 3/03 | (2006.01) |
| G06K 9/00 | (2006.01) |

(52) U.S. Cl.
CPC .............. *G06F 3/017* (2013.01); *B66B 1/468* (2013.01); *G05B 15/02* (2013.01); *G06F 3/011* (2013.01); *G06F 3/0304* (2013.01); *G06K 9/00335* (2013.01); *H04L 67/12* (2013.01); *B66B 2201/4638* (2013.01)

(58) Field of Classification Search
CPC .......... G06F 3/017; G05B 15/02; H04L 67/12
See application file for complete search history.

(56) References Cited

U.S. PATENT DOCUMENTS

| | | | |
|---|---|---|---|
| 5,255,341 | A | 10/1993 | Nakajima |
| 6,788,809 | B1 | 9/2004 | Grzeszczuk et al. |
| 7,536,034 | B2 | 5/2009 | Rhoads et al. |
| 8,634,981 | B1 | 1/2014 | Hyde et al. |

(Continued)

FOREIGN PATENT DOCUMENTS

| | | |
|---|---|---|
| CN | TWM509215 U | 9/2015 |
| CN | 204727357 U | 10/2015 |

(Continued)

OTHER PUBLICATIONS

Partial European Search Report for application No. 17187147.8-1216 dated Jan. 26, 2018, 14 pages.

(Continued)

*Primary Examiner* — Ibrahim A Khan
(74) *Attorney, Agent, or Firm* — Cantor Colburn LLP

(57) ABSTRACT

A gesture and location recognition system and method are provided. The system includes a sensor device that captures a data signal of a user and detects a gesture input from the user from the data signal, wherein a user location can be calculated based on a sensor location of the sensor device in a building and the collected data signal of the user, a signal processing device that generates a control signal based on the gesture input and the user location, and in-building equipment that receives the control signal from the signal processing device and controls the in-building equipment based on the control signal.

11 Claims, 10 Drawing Sheets

(56) References Cited

U.S. PATENT DOCUMENTS

| | | |
|---|---|---|
| 9,045,314 B2 | 6/2015 | Finschi |
| 2007/0041352 A1* | 2/2007 | Frankel .................. B66B 1/468 |
| | | 370/338 |
| 2008/0256494 A1 | 10/2008 | Greenfield |
| 2012/0175192 A1 | 7/2012 | Tsou |
| 2014/0064566 A1 | 3/2014 | Shreve et al. |
| 2015/0002391 A1 | 1/2015 | Chen |
| 2015/0009124 A1 | 1/2015 | Antoniac |
| 2016/0031675 A1* | 2/2016 | Silvennoinen .......... B66B 1/468 |
| | | 187/247 |
| 2016/0311646 A1* | 10/2016 | Bryant ............... G06K 9/00288 |
| 2018/0052520 A1 | 2/2018 | Amores Llopis et al. |

FOREIGN PATENT DOCUMENTS

| | | |
|---|---|---|
| EP | 1110899 A1 | 6/2001 |
| EP | 2538305 A2 | 12/2012 |
| KR | 101613542 B1 | 4/2016 |
| WO | 2015023278 A1 | 2/2015 |
| WO | 2015034459 A1 | 3/2015 |
| WO | 2015183256 A1 | 12/2015 |
| WO | 2016100293 A1 | 6/2016 |

OTHER PUBLICATIONS

European Search Report for application No. 17187132.0-1216 dated Jan. 26, 2018; 7 pages.

* cited by examiner

SYSTEM AND METHOD FOR DISTANT GESTURE-BASED CONTROL USING A NETWORK OF SENSORS ACROSS THE BUILDING

BACKGROUND

The subject matter disclosed herein generally relates to controlling in-building equipment and, more particularly, to gesture-based control of the in-building equipment.

Traditionally, a person's interaction with in-building equipment such as an elevator system, lighting, air conditioning, electronic equipment, doors, windows, window blinds, etc. depends on physical interaction such as pushing buttons or switches, entering a destination at a kiosk, etc. Further, a person's interaction with some in-building equipment is designed to facilitate business management applications, including maintenance scheduling, asset replacement, elevator dispatching, air conditioning, lighting control, etc. through the physical interaction with the in-building equipment. For example, current touch systems attempt to solve requesting an elevator from other locations other than at the elevator through, for example, the use of mobile phones, or with keypads that can be placed in different parts of the building. The first solution requires the users to carry a mobile phone and install the appropriate application. The second solution requires installation of keypads which is costly and not always convenient.

With advances in technology, systems requiring less physical interaction can be implemented such as voice or gesture controlled systems with different activation systems. For example, an existing auditory system can employ one of two modes to activate a voice recognition system. Typically, a first mode includes a user pushing a button to activate the voice recognition system, and a second mode includes the user speaking a specific set of words to the voice recognition system such as "OK, Google". However, both activation methods require the user to be within very close proximity of the in-building equipment. Similarly, current gesture based system require a user to approach and be within or near the in-building equipment, for example, the elevators in the elevator lobby.

None of these implementations allow for calling and/or controlling of in-building equipment such as an elevator from a particular location and distance away.

BRIEF DESCRIPTION

According to one embodiment a gesture and location recognition system is provide. The system includes a sensor device that captures a data signal of a user and detects a gesture input from the user from the data signal, wherein a user location can be calculated based on a sensor location of the sensor device in a building and the collected data signal of the user, a signal processing device that generates a control signal based on the gesture input and the user location, and in-building equipment that receives the control signal from the signal processing device and controls the in-building equipment based on the control signal.

In addition to one or more of the features described above, or as an alternative, further embodiments may include an elevator system that includes one or more elevator controllers and one or more elevator cars, wherein the one or more elevator controllers receive the control signal from the signal processing device and controls the one or more elevator cars based on the control signal.

In addition to one or more of the features described above, or as an alternative, further embodiments may include a network of sensor devices each located at a different location in the building.

In addition to one or more of the features described above, or as an alternative, further embodiments may include, wherein each of the sensor device in the network of sensor devices is placed outside a normal interaction distance for calling an elevator car in an elevator lobby.

In addition to one or more of the features described above, or as an alternative, further embodiments may include, wherein the sensor device is at least one from a group consisting of a 3D sensor, a 2D sensor, a motion sensor, a microphone or an array of microphones, a button or set of buttons, a switch or set of switches, a keyboard, a touchscreen, an RFID reader, a capacitive sensor, a wireless beacon sensor, a pressure sensitive floor mat, a gravity gradiometer, a camera, a depth sensor, and a mobile device tracking system.

In addition to one or more of the features described above, or as an alternative, further embodiments may include, wherein the data signal is at least one from a group consisting of a visual representation and a 3D depth map, and wherein the visual representation is at least one from a group consisting of an image, a collection of images, a video, an animation, a cropped portion of an image, and a cropped portion of a video.

In addition to one or more of the features described above, or as an alternative, further embodiments may include, wherein the gesture input can include at least one from a group consisting of an arm movement, a body movement, a finger movement, a head movement, a facial movement, moving an object, and a combination of movements.

In addition to one or more of the features described above, or as an alternative, further embodiments may include, wherein the signal processing device estimates a travel time for the user to travel to the elevator car in the elevator lobby from the gesture recognition point where the user input the gesture input.

In addition to one or more of the features described above, or as an alternative, further embodiments may include, wherein the signal processing device adjusts the elevator call based on the estimated travel time to travel to the elevator car.

In addition to one or more of the features described above, or as an alternative, further embodiments may include, further including tracking the user moving through the building as the user passes other sensors in the network of sensors and adjusting the estimated time to travel to the in-building equipment.

In addition to one or more of the features described above, or as an alternative, further embodiments may include a mobile device of the user, wherein the mobile device is one selected from a group consisting of a mobile phone, a beacon, an RFID tag, a tablet, and a wearable electronic, and wherein the mobile device provides additional information and tracking ability to the in-building equipment.

According to another embodiment, a method with gesture and location recognition is provided. The method includes capturing, using a sensor device, a data signal of a user and detects a gesture input from the user from the data signal, calculating a user location based on a sensor location of the sensor device in a building and the collected data signal of the user, generating, using a signal processing device, a control signal based on the gesture input and the user location, and receiving, using in-building equipment, the control signal from the signal processing device and controlling the in-building equipment based on the control signal.

In addition to one or more of the features described above, or as an alternative, further embodiments may include receiving, using an elevator controller, the control signal from the signal processing device and controlling the one or more elevator cars based on the control signal.

In addition to one or more of the features described above, or as an alternative, further embodiments may include providing a network of sensor devices each located at a different location in the building, wherein each of the sensor device in the network of sensor devices is placed outside a normal interaction distance for calling an elevator car in an elevator lobby.

In addition to one or more of the features described above, or as an alternative, further embodiments may include, wherein the sensor device is at least one from a group consisting of a 3D sensor, a 2D sensor, a motion sensor, a microphone or an array of microphones, a button or set of buttons, a switch or set of switches, a keyboard, a touchscreen, an RFID reader, a capacitive sensor, a wireless beacon sensor, a pressure sensitive floor mat, a gravity gradiometer, a camera, a depth sensor, and a mobile device tracking system.

In addition to one or more of the features described above, or as an alternative, further embodiments may include, wherein the data signal is at least one from a group consisting of a visual representation and a 3D depth map, and wherein the visual representation is at least one from a group consisting of an image, a collection of images, a video, an animation, a cropped portion of an image, and a cropped portion of a video.

In addition to one or more of the features described above, or as an alternative, further embodiments may include, wherein the gesture input can include at least one from a group consisting of an arm movement, a body movement, a finger movement, a head movement, a facial movement, moving an object, and a combination of movements.

In addition to one or more of the features described above, or as an alternative, further embodiments may include estimating, using the signal processing device, a travel time for the user to travel to the elevator car in the elevator lobby from the gesture recognition point where the user input the gesture input, and adjusting, using the signal processing device, the elevator call based on the estimated travel time to travel to the elevator car.

In addition to one or more of the features described above, or as an alternative, further embodiments may include tracking the user moving through the building as the user passes other sensors in the network of sensors, and adjusting the estimated time to travel to the elevator and the elevator call.

In addition to one or more of the features described above, or as an alternative, further embodiments may include providing additional information and tracking ability to the elevator system using a mobile device of the user, wherein the mobile device is one selected from a group consisting of a mobile phone, a beacon, an RFID tag, a tablet, a wireless computing device, and a wearable electronic.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
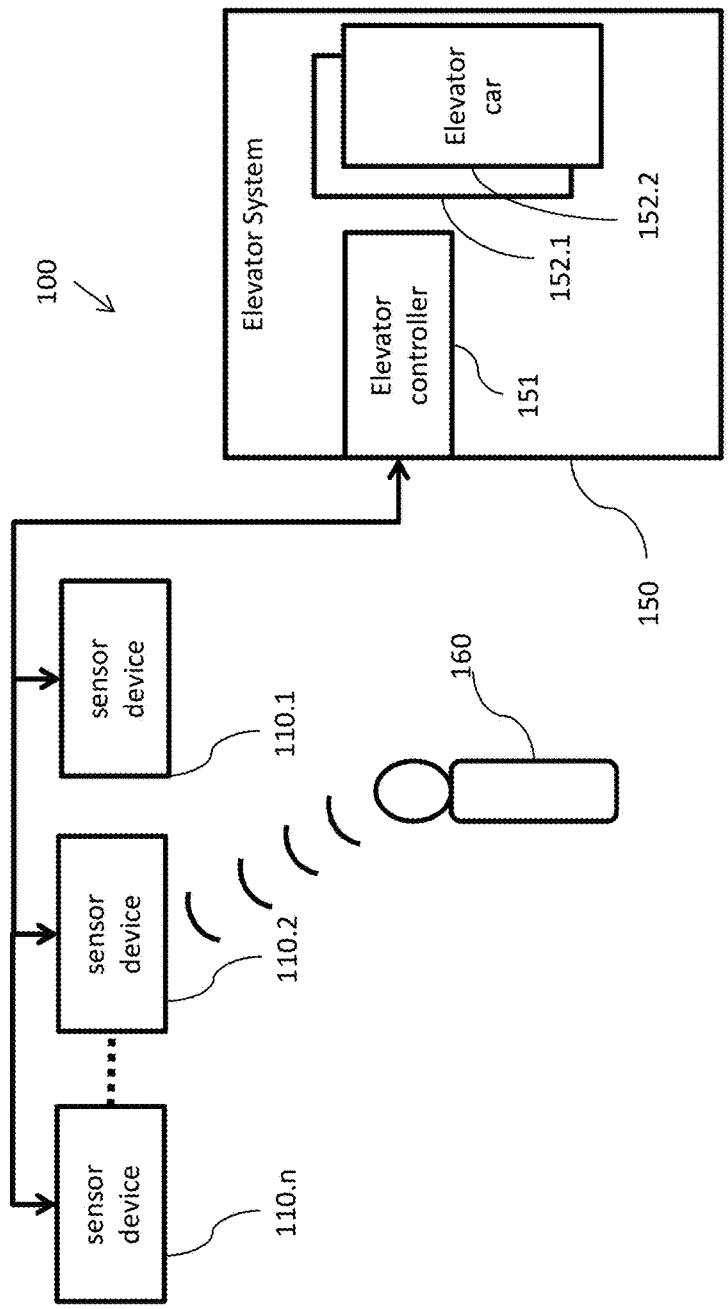
FIG. 1 is a block diagram of a gesture and location recognition system for controlling in-building equipment in accordance with one or more embodiments.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a system and method for gesture-based interaction with in-building equipment such as, for example, an elevator, lights, air conditioning, doors, blinds, electronics, copier, speakers, etc., from a distance. According to other embodiments, the system and method could be used to interact and control other in-building equipment such as transportation systems such as an escalator, on-demand people mover, etc. at a distance. One or more embodiments integrate people detection and tracking along with spatio-temporal descriptors or motion signatures to represent the gestures along with state machines to track complex gesture identification.

For example, the interactions with in-building equipment are many and varied. A person might wish to control the local environment, such as lighting, heating, ventilation, and air conditioning (HVAC), open or close doors, and the like; control services, such as provision of supplies, removal of trash, and the like; control local equipment, such as locking or unlocking a computer, turning on or off a projector, and the like; interact with a security system, such as gesturing if anyone else is on the same floor, requesting assistance, and the like; or interact with in-building transportation, such as summoning an elevator, selecting a destination, and the like. This latter example of interacting with an elevator shall be used as exemplary, but not limiting, in the specification, unless specifically noted otherwise.

In one embodiment, the user uses a gesture-based interface. Additionally, the gesture based interface is part of a system that also includes a tracking system that extrapolates the expected arrival time (ETA) of the user to the elevator being called. The system can also register the hall call with a delay calculated to avoid having an elevator car wait excessively, and tracks the user sending changes to the hall call if the ETA deviates from the latest estimate. In an alternative embodiment, the remote command for the elevator exploits the user looking at the camera when doing the gesture. In yet another alternative embodiment, the remote command for the elevator includes making a characteristic sound (e.g., snapping fingers) in addition to the gesture. The detection and tracking system may use of other sensors (e.g., PIR) instead of optical cameras or depth sensors. The sensor can be a 3D sensor, such as a depth sensor; a 2D sensor, such as a video camera; a motion sensor, such as a PIR sensor; a microphone or an array of microphones; a button or set of buttons; a switch or set of switches; a keyboard; a touchscreen; an RFID reader; a capacitive sensor; a wireless beacon sensor; a pressure sensitive floor mat, a gravity gradiometer, or any other known sensor or system designed for person detection and/or intent recognition as described elsewhere herein.

Additionally, one or more embodiments detect gestures using sensors in such a way that there is a low false positive rate by a combination of multiple factors. Specifically, a low false positive rate can be provided because a higher threshold for a positive detection can be implemented because a feedback feature is also provided that allows a user to know if the gesture was detected. If it was not because of the higher threshold the user will know and can try again to make a more accurate gesture. For example, a specific example of the factors can include: the system making an elevator call only when it has a very high confidence on the gesture being made. This allows the system to have a low number of false positives at the cost of missing the detection of some gestures (but not many). The system compensates this factor by communicating to the user whether the gesture has been detected or not. Other means of reducing the false positive rate without many missed detections are provided in one or more embodiments herewith. For example, one or more embodiments include exploiting the orientation of the face (people will typically look at the camera to see if it was detected), or using additional sources of information (the user might snap the fingers while doing the gesture for example, and this noise can be recognized by the system if the sensor has also a microphone). Accordingly, one or more embodiments include being able to call the elevator through gestures across the building, and providing feedback to the user to whether or not the gesture has been made.

In accordance with other embodiments, calling an elevator from distance, i.e., in parts of the building that are far from the elevator is provided. This system and method allows for the optimization of elevator traffic and allocation, and can reduce the average waiting time of users. Further, according to another embodiment, the system does not require a user to carry any device or install any additional hardware. For example, a user just needs to make a gesture with the hand or arm to call the elevator in a natural way. To detect these gestures, this embodiment can leverage an existing network of sensors (e.g., optical cameras, depth sensors, etc.) already in place throughout the building such as security cameras. According to one or more embodiments, the sensor can be a 3D sensor, such as a depth sensor; a 2D sensor, such as a video camera; a motion sensor, such as a PIR sensor; a microphone or an array of microphones; a button or set of buttons; a switch or set of switches; a keyboard; a touchscreen; an RFID reader; a capacitive sensor; a wireless beacon sensor; a pressure sensitive floor mat, a gravity gradiometer, or any other known sensor or system designed for person detection and/or intent recognition as described elsewhere herein.

Figure 4:
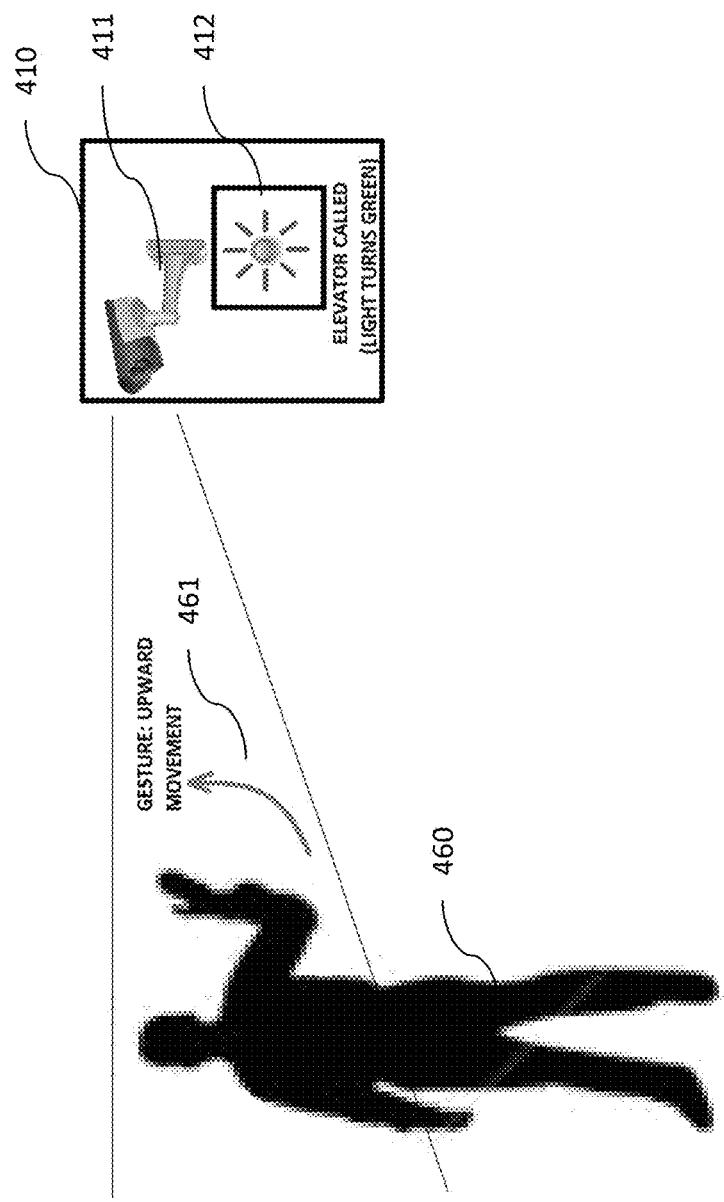
FIG. 4 depicts a user interaction between the user and the gesture and location recognition system in accordance with one or more embodiments.

Accordingly, one or more embodiments as disclosure herewith provide a method and/or system for controlling in-building equipment from distant places in the building. For example, the user knows that he/she has called an elevator, for example by observing a green light that turns on close to the sensor as shown in FIG. 4.

Turning now to FIG. 1, a block diagram of a system 100 with gesture at a distance control is shown in accordance with one or more embodiments. The system 100 includes at least one sensor device 110.1 that is located somewhere within a building. According to one embodiment, this sensor device 110.1 is placed away from the elevator lobby elsewhere on the floor. Further this sensor device 110.1 can be a video camera that can capture a data signal that includes video sequences of a user. The system 100 may further include other sensor devices 110.2 through 110.$n$ that are provided at other locations throughout the building floor. The system 100 also includes an elevator system 150 that has an elevator controller 151 and one or more elevator cars 152.1 and 152.2. The sensor devices 110.1-110.$n$ all are communicatively connected with the elevator system 150 such that they can transmit and receive signals to the elevator controller 151. These sensor devices 110.1-110.$n$ can be directly or indirectly connected to the system 150. As shown the elevator controller 151 also functions as a digital signal processor for processing the video signals to detect if a gesture has been provided and if one is detected the elevator controller 151 sends a confirmation signal back to the respective sensor device 110.2 that provided the signal that contained a gesture. The sensor device 110.2 can then provide a notification to the user 160 that the gesture was received and processed and that an elevator is being called. According to another embodiment, a notification device such as a screen, sign, loudspeaker, etc. that is near the sensor provides the notification to the user 160. Alternatively, notice can be provided to the user by sending a signal to a user mobile device that then alerts the user. Another embodiment includes transmitting a notice signal to a display device that is near the detected location of the user. The display device then transmits a notification to the user. For example, the display device can include a visual or auditory display device that shows an image to a user or gives a verbal confirmation sound that indicates the desired notification. The user 160 can then travel to the elevator car 152.1 or 152.2. Further, the elevator controller 151 can also calculate an estimated time of arrival based on which sensor device 110.2 provided the gesture. Accordingly, an elevator call can be tailored to best suit the user 160.

Figure 2:
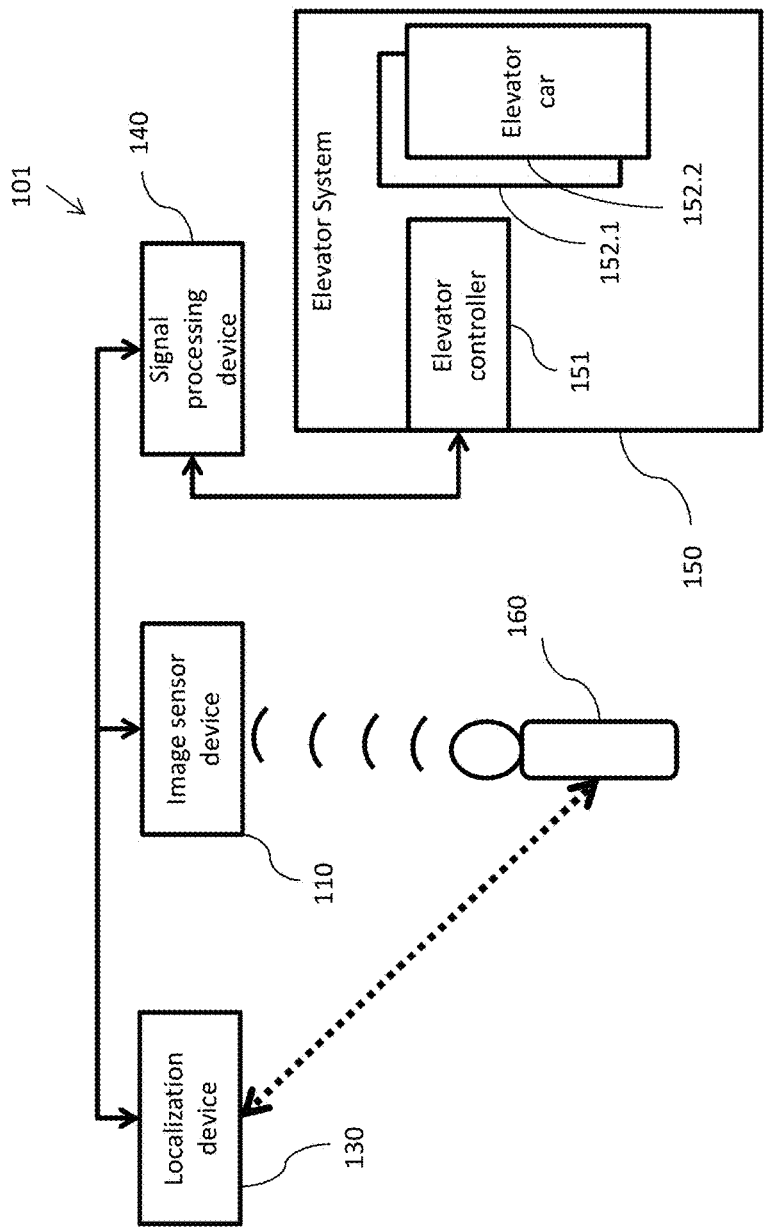
FIG. 2 is a block diagram of a gesture and location recognition system for controlling in-building equipment in accordance with one or more embodiments.

Turning now to FIG. 2, a block diagram of a system 101 with gesture at a distance control is shown in accordance with one or more embodiments. This system is similar to that shown in FIG. 1 in that includes one or more sensor devices 110.1-110.n connected to an elevator system 150 that includes an elevator controller 151 and one or more elevator cars 152.1 and 152.2. The system 101 also includes a separate signal processing device 140 that is separate from the elevator controller 151. The signal processing device 140 is able to process all the received data from the sensor device and any other sensors, devices, or systems and generate a normal elevator call that can be provided to the elevator system 150. This way the system can be used with already existing elevator systems without a need to replace the elevator controller. Additionally the signal processing device 140 can be provided in a number of locations such as, for example, within the building, as part of one of the sensor devices, off-site, or a combination thereof. Further the system can include a localization device 130 such as a device detection scheme using wireless routers, or another camera array in the building or some other form of detecting devices. This localization device 130 can provide a location of the user to the signal processing device 140. For example, a localization device 130 can be made up of wireless communication hubs that can detect signal strength of the user's mobile device which can be used to predict a location. According to another embodiment, the localization device can use cameras placed throughout the building at known location that can detect the user passing through the camera's field of sight and can therefore identify where the user is within the building. Other known localization devices can be used as well such as audio echo location systems and/or an array of pressure sensors installed in the floor at different locations. This can be helpful if the image sensor device 110 that receives the gesture from the user 160 is at an unknown location, such as a mobile unit that moves about the building or if the sensor device 110 is moved to a new location and the new location has not yet been programmed into the system.

Figure 3:
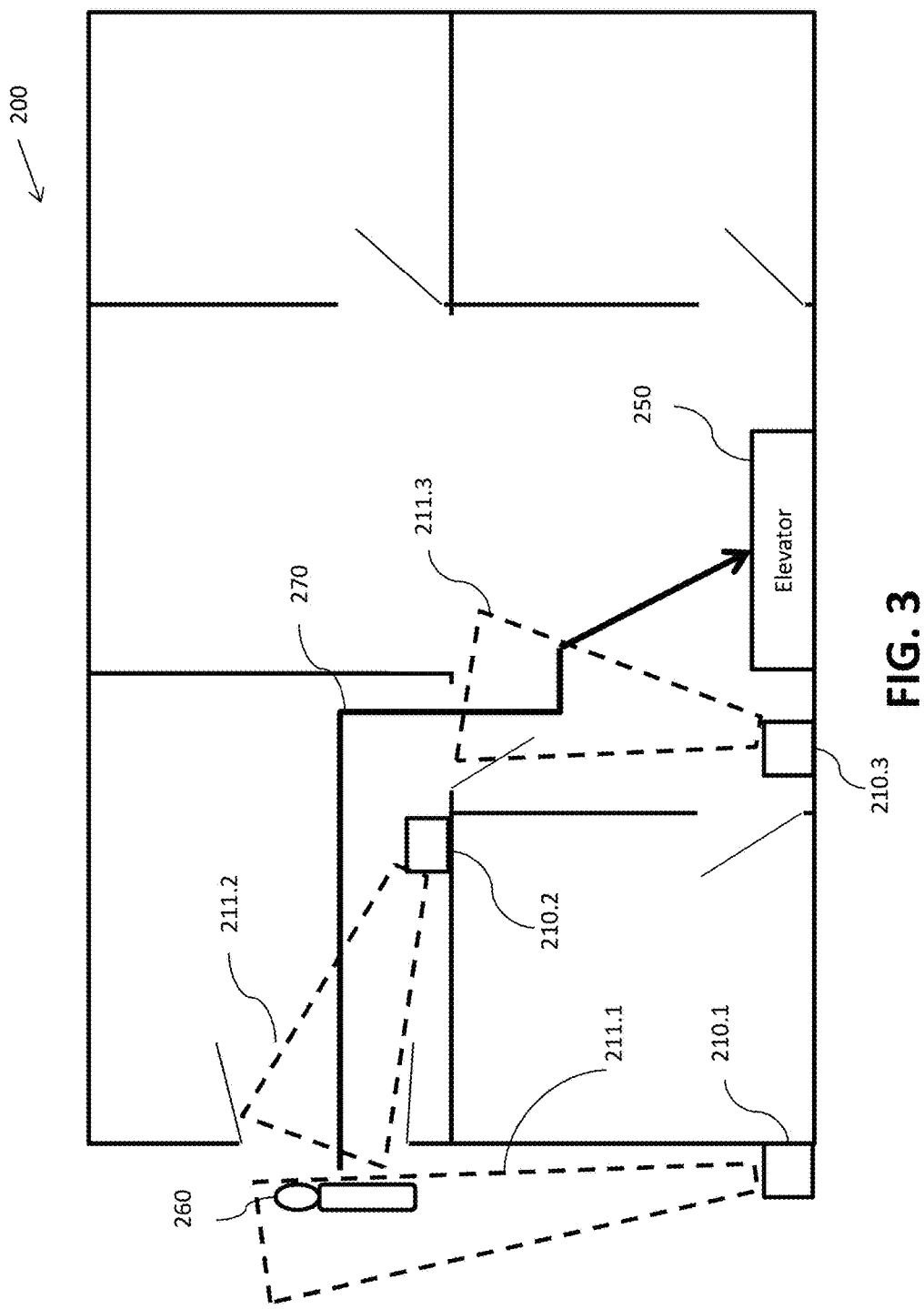
FIG. 3 is a diagram of a building floor that includes the gesture and location recognition system in accordance with one or more embodiments.

FIG. 3 is a diagram of a building floor 200 that includes the user 260 who makes a gesture and gesture and location detecting system that includes one or more sensors 210.1-210.3 that each have a corresponding detection field 211.1-211.3 and an in-building equipment such as an elevator 250 in accordance with one or more embodiments of the present disclosure. The user 260 can make a gesture with their hand and/or arm to indicate his/her intention to use an elevator 250. As shown, the gesture is captured by a sensor (210.1) as the user is within the detection field 211.1 (e.g., optical camera, infrared camera or depth sensor) that covers the entrance area, and the system calls the elevator 250 before the user 260 arrives to the door. According to other embodiments, the sensor can be a 3D sensor, such as a depth sensor; a 2D sensor, such as a video camera; a motion sensor, such as a PIR sensor; a microphone or an array of microphones; a button or set of buttons; a switch or set of switches; a keyboard; a touchscreen; an RFID reader; a capacitive sensor; a wireless beacon sensor; a pressure sensitive floor mat, a gravity gradiometer, or any other known sensor or system designed for person detection and/or intent recognition as described elsewhere herein. Accordingly, according to one or more embodiments, the sensor captures a data signal that can be at least one of a visual representation and/or a 3D depth map, etc.

Thus, as shown, a gesture can be provided that is detected by one or more sensors 210.1-210.3 which can be cameras. The cameras 210.1-210.3 can provide the location of the user 260 and the gesture from user 260 that can be processed to determine a call to an elevator 250. Processing the location and gesture can be used to generate a user path 270 through the building floor to the elevator. This generated path 270 estimate can be used to provide an estimate time of arrival at the elevators. For example, different paths through a building can have a corresponding estimate travel time to traverse. This estimate travel time value can be an average travel time detected over a certain time frame, it can be specific to a particular user based on their known speed or average speed over time, or can be set by a building manager. Once a path 270 is generated for a user, the path 270 can be analyzed and matched with an estimate travel time. A combination of estimate travel times can be added together if the user takes a long winding path for example, or if the user begins traveling part way along a path, the estimate can be reduced as well. With this estimated time of arrival the elevator system can call an elevator that best provided service to the user while also maintaining system optimization. As shown in FIG. 3, a small floor plan is provided where the user is not very far away from the elevator. Accordingly, FIG. 3 shows the same idea with a bigger plan that might belong to a hotel for example.

According to another embodiment, the user 260 may enter the sensor 210.1 field of detection 211.1 and not make a gesture. The system will not take any action in this case. The user 260 may then travel into and around the building. Then at some point the user 260 may decide to call an elevator 250. The user can then enter a field of detection, for example the field of detection 211.2 for sensor 210.2. The user 260 can then make a gesture that is detected by the sensor 210.2. When this occurs, the sensor 210.2 can analyze or transmit the signal for analysis. The analysis includes determining what the gesture is requesting and also the location of the user 260. Once these are determined a path 270 to the user requested elevator 250 can be calculated along with an estimate of how long it will take the user to travel along the path 270 to reach the elevator 250. For example, it can be determined that the user 260 will take 1 minutes and 35 seconds to reach the elevator 250. The system can then determine how far the nearest elevator car is, which can be for example 35 seconds away. The system can then determine that calling the elevator in one minute will have it arrive at the same time as the user 260 arrives at the elevator 250.

According to another embodiment, a user may move along the path 270 only to decide to no longer take the elevator. The sensors 210.1-210.3 can detect another gesture from the user cancelling the in-building equipment call. If the user 260 does not make a cancelation gesture, the sensors 210.1-210.3 can also determine that the user is no longer using the elevator 250 for example by tracking that the user has diverged from the path 270 for a certain amount of time and/or distance. The system can at first detecting this divergence from the path 270 provide the user 260 additional time in case the user 260 plan to return to the path 270. After a determined amount of time, the system can determine that the user no longer is going to use the elevator 250 and can cancel the elevator call. According to another embodiment, the system may indicate to the user by sending a notification to the user that the previous gesture based call has been cancelled.

As shown in FIG. 3, and according to another embodiment, an estimated path 270 that the user 260 would follow to take the elevator 250 is shown. This path 270 can be used to calculate an estimated time to arrive at the elevator 250, which can use that information to wait and then call a particular elevator car at the particular time. For example, a user 260 may provide a gesture that they need an elevator using a sensor 210.1-210.3. The sensors 210.1-210.3 can then track the user's movements and calculate a real-time estimate based on the current speed of the user which can be adjusted as the user moves through the building. For example, if a user is moving slowly the time before calling an elevator 250 will be extended. Alternatively if a user 260 is detected as running for the elevator 250 a call can be made sooner if not immediately to have an elevator car there sooner based on the user's traversal through the building.

After detecting the gesture, the system can call the elevator right away or, alternatively, it can wait for a short time before actually calling it. In the latter case, the system can use the location of the sensor that captured the gesture to estimate the time that it will take the user to arrive to the elevator, in order to place the call.

FIG. 4 depicts an interaction between a user 460 and the detection system 410 in accordance with one or more embodiments of the present disclosure. Particularly, FIG. 4 illustrates an interaction between a user 460 and a sensor 411 (e.g., optical camera, depth sensor, etc.) of the system. For example, the user 460 makes a gesture 461, and the system 410 confirms that the elevator has been called by producing a visible signal 412. Specifically, as shown the gesture 461 is a n upward arm movement of the user's 460 left arm. According to other embodiments, this gesture can be a hand waving, a movement of another user appendage, a head shake, a combination of movements, and/or a combination of movements and auditory commands. Examples of this confirmation include turning on some light 412 close to the sensor 411 capturing the gesture 461, or emitting a characteristic noise that the user 460 can recognize. According to other embodiments, the system 410 can provide a signal that is transmitted to a user's 460 mobile device or to a display screen in proximity of the user. Providing this type of feedback to the user 460 is useful due to the fact that the person 460 might need to repeat the gesture 461 if it was not well captured the first time. According to other embodiments, the feedback can be provided to the user 460 by other means such as by an auditory sound or signal or a digital signal can be transmitted to a user's personal electronic device such as a cellphone, smartwatch, etc.

Figure 5:
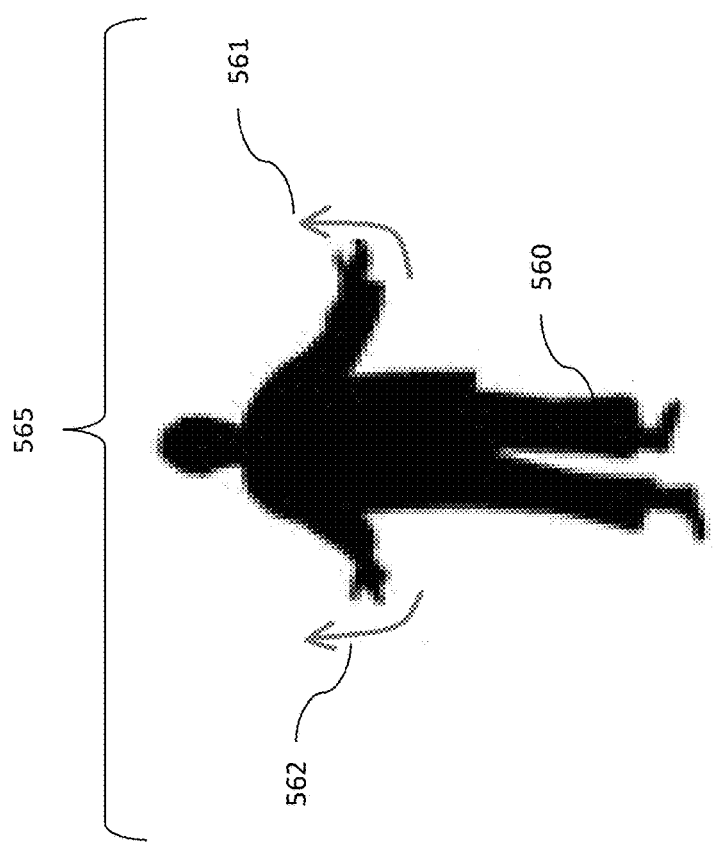
FIG. 5 depicts a user gesture in accordance with one or more embodiments.

FIG. 5 depicts a user 560 and a user gesture 565 in accordance with one or more embodiments of the present disclosure. As shown the user 560 raises their left arm making a first gesture 561 and also raises their right arm making a second gesture 562. These two gestures 561, 562 are combined together to create the user gesture 565. When this gesture 565 is detected the system can then generate a control signal based on the known meaning of the particular gesture 565. For example, as shown, the gesture 565 has the user 560 raising both arms which can indicate a desire to take an elevator up. According to one or more embodiments, a simple gesture can be to just raise one an arm, if the user wants to go upstairs, or make a downwards movement with the arm if the intention is to go downstairs. Such gestures would be most useful in buildings having traditional two button elevator systems, but may also be useful in destination dispatch systems. For example, a user may make a upward motion indicting a desire to go up and also verbally call out the floor they desire. According to other embodiment, the user may raise their arm a specific distance that indicates a particular floor or, according to another embodiment, raise and hold their arm up to increment a counter that counts the time that is then translated to a floor number. For example a user may hold their arm up for 10 seconds indicating a desire to go to floor 10. According to another embodiment, the user may use fingers to indicate the floor number, such as holding up 4 fingers to indicate floor 4. Other gestures, combination of gestures, and combination of gestures and auditory response, are also envisioned that can indicated a number of different requests.

According to one or more embodiments, an issue with simple gestures is that they can be accidentally be performed by people. In general, simple gestures can lead to a higher number of false positives. In order to avoid this, one or more embodiments can require the user to perform more complex gestures, e.g., involving more than one arm, as illustrated in FIG. 5. In this case, the gesture recognition system is based on detecting an upward movement on both sides 561, 561 of a human body 560. According to other embodiments, other possibilities are to perform the same simple gesture twice, so that the system is completely sure that the user 560 intends to use the elevator. Additionally, alternative embodiments might require the user 560 to make some characteristic sound (e.g., snapping fingers, or whistling) in addition to the gesture. In this case the system makes use of multiple sources of evidence (gesture and audio pattern), which significantly reduces the number of false positives.

Figure 6:
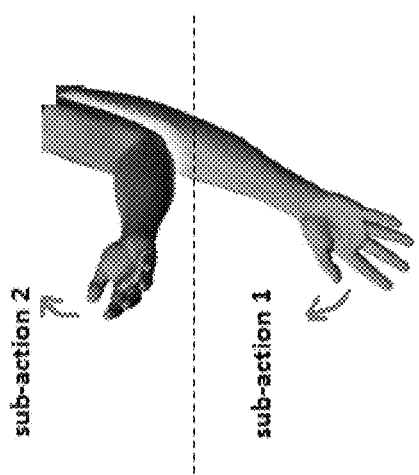
FIG. 6 depicts a two-part user gesture that is made up of two sub-actions in accordance with one or more embodiments.

FIG. 6 depicts a two-part user gesture that is made up of two sub-actions in accordance with one or more embodiments. Decomposition of the gesture into a temporal sequence of movements or "sub-actions" is shown. In this example, the gesture (action) consists of bending the arm upwards. This action produces a series of consecutive movements, called sub-actions. Each movement or sub-action is associated with a specific time period and can be described by a characteristic motion vector in a specific spatial region (in the example, the first sub-action occurs at low height and the second one at middle height). Two different approaches can be utilized to capture this sequence of sub-actions, as illustrated in FIG. 7 and FIG. 8.

Figure 7:
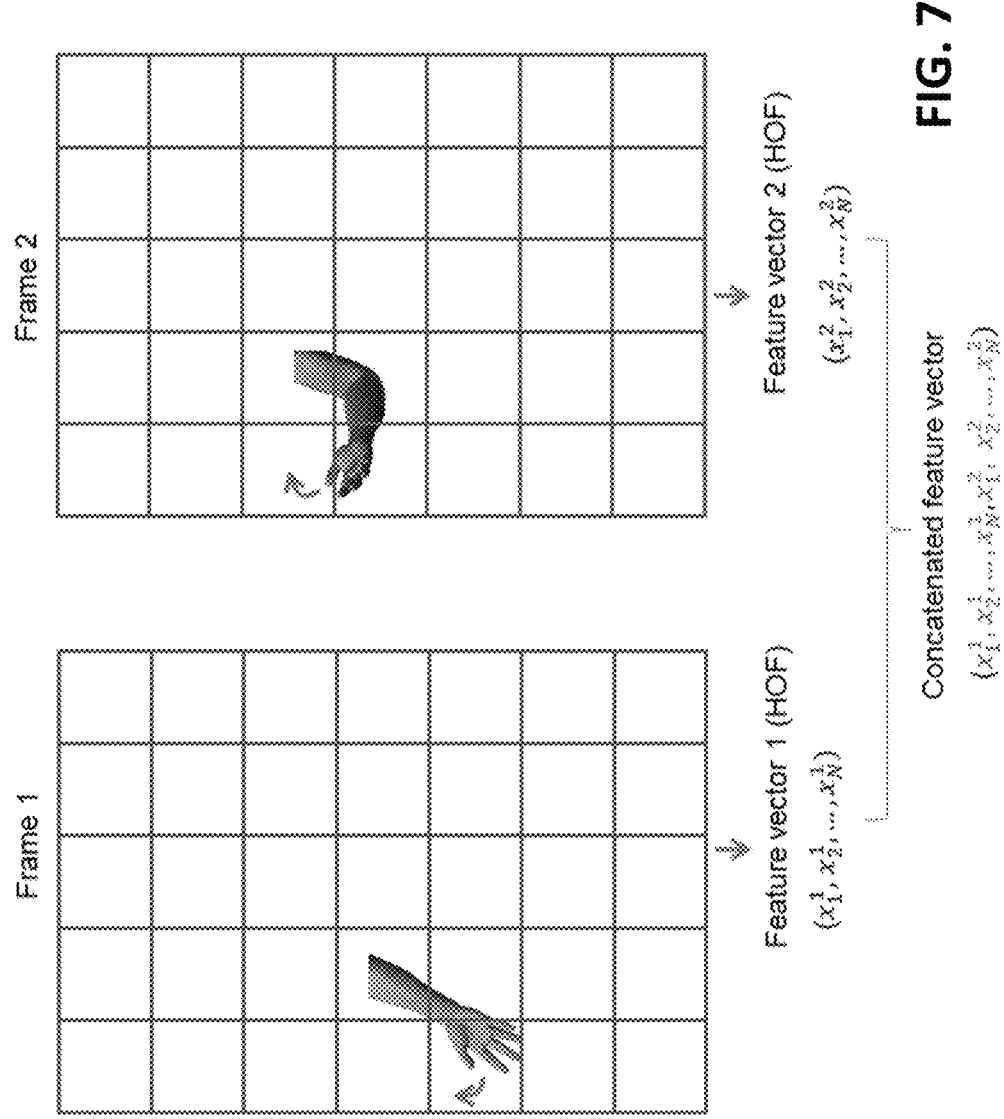
FIG. 7 depicts a two-part user gesture that is made up of two sub-actions in accordance with one or more embodiments.

FIG. 7 depicts a two-part user gesture (sub-action 1 and sub-action 2) that is made up of two sub-actions in accordance with one or more embodiments. Specifically, as shown, a sub-action 1 is a up and outward rotating motion starting from a completely down position to a halfway point were the user arm is perpendicular with the ground. The second sub-action 2 is a second movement going up and rotating in toward the user with the user hand rotating in toward the user. As shown the vector for each sub-action is shown as a collection of sub vectors for each frame the movement passes through. These sub-actions can then be concatenated together into an overall vector for the gesture.

Figure 8:
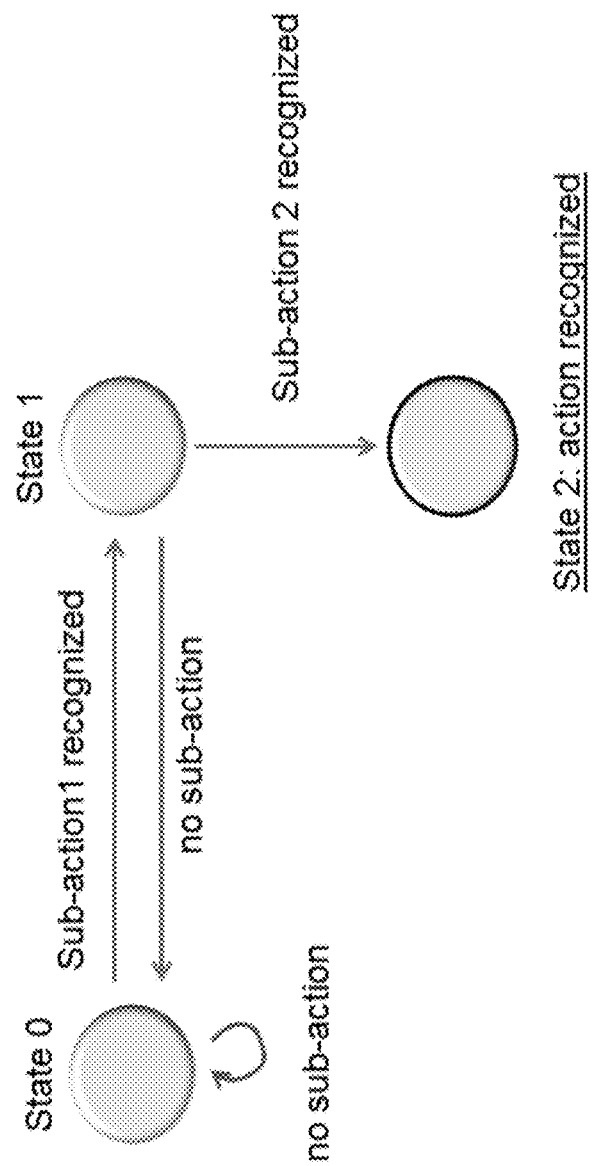
FIG. 8 depicts a state diagram for a gesture being processed in accordance with one or more embodiments.

Further, FIG. 8 depicts a state diagram for a gesture being processed with one or more embodiments. In order to account for a dynamic gesture, which produces different motion vectors at consecutive times, one can break down the gesture into a sequence of sub-actions, as illustrated in FIG. 6 for the rising arm gesture. Based on this, one can follow a number of approaches, such as the two described herewith, or others not described. FIG. 7 illustrates the first type of approach. It consists of building a spatial-temporal descriptor of a high order function (HOF), obtained by concatenating the feature vectors at consecutive frames of the sequence. The concatenated feature vector is then passed to a classifier which determines if it corresponds to the target gesture. FIG. 8 illustrates the second type of approach, where one makes use of a state machine that allows one to account for the recognition of the different sub-actions in the sequence. Each state applies a classifier that is specifically trained to recognize one of the sub-actions. Although only two sub-actions are used in this example, the gesture can be broken down into as many sub-actions as desired, or can a single sub-action can be used (i.e., the complete gesture), which corresponds to the case of not using a state machine and, instead, just using a classifier.

FIG. 7 includes an illustration of concatenating feature vectors over time in order to capture the different motion vectors produced by the gesture over time. The concatenated descriptor captures this information and it can be regarded as a spatial-temporal descriptor of the gesture. Shown are only two frames in the illustration, but more could be used. The concatenated feature vectors can belong to contiguous frames or to frames separated by a given elapse of time, in order to sample the trajectory of the arm appropriately.

FIG. 8 includes an example of state machine that can be used to detect a complex gesture as consecutive sub-actions (see FIG. 7), where each sub-action is detected by a specialized classifier. As shown, a system starts in state 0 where no action is recognized, started, or partially recognized at all. If no sub-action is detected the system will continue to remain in state 0 as indicated by the "no sub-action" loop. Next, when a sub-action 1 is detected the system moves into state 1 in which the system now has partially recognized a gesture and is actively searching for another sub-action. If no sub-action is detected for a set time then system will return the state 0. However, if the system does recognize the sub-action 2, the system will transition to state 2 which is a state where the system had detected action and will take action in accordance with the detected action. For example, if the system detected the motion shown in FIGS. 6 and 8, the system, which can be an elevator system, would call an elevator car to take the user upward in the building.

In practice, the output of the classification process will be a continuous real value, where high values indicate high confidence that the gesture was made. For example, when detecting a sub-action that is a combination of six sub-vectors from each frame, it is possible that only 4 are detected meaning a weaker detection was made. In contrast if all six sub-vectors are recognized then a strong detection was made. By imposing a high threshold on this value we can obtain a low number of false positives, at the expense of losing some true positives (i.e., valid gestures that are not detected). Losing true positives is not critical due to the fact that the user can see when the elevator has been actually called or when the gesture has not been detected, as explained above (see FIG. 4). This way, the user can repeat the gesture if not detected the first time. Furthermore, we can build a second state machine that allows one to accumulate the evidence of the gesture detection over time, as illustrated in FIG. 8.

Figure 9:
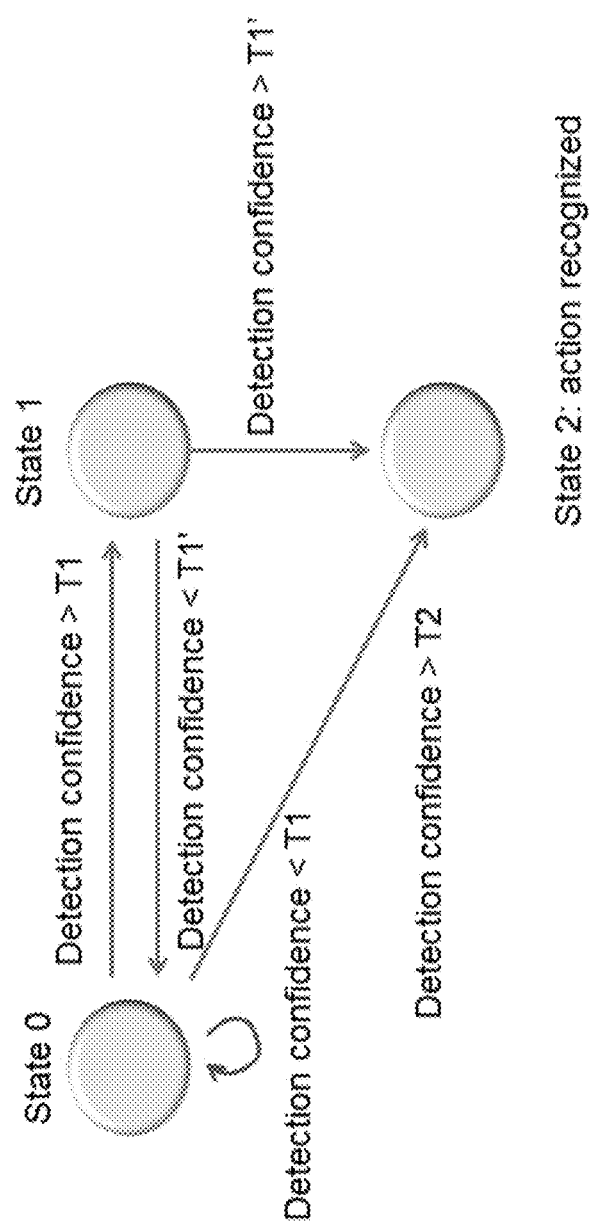
FIG. 9 depicts a state diagram for a gesture being processed in accordance with one or more embodiments.

FIG. 9 depicts a state diagram for a gesture being processed with one or more embodiments. Particularly, FIG. 9 includes an example of state machine that allows one to increase the evidence of the gesture detector over time. In state 0, if the user performs some gesture, three things might happen. In the first case, the system recognizes the gesture with enough confidence (confidence>T2). In this case the machine moves to state 2 where the action (gesture) is recognized and the system indicates this to the user (e.g., by turning on a green light, see FIG. 4). In the second case, the system might detect the gesture but not be completely sure (T1<confidence<T2). In this case, the machine moves to state 1, and does not tell the user that the gesture was detected. The machine expects the user to repeat the gesture. If, after a brief elapse of time, the system detects the gesture with confidence>T1', the action is considered as recognized and this is signaled to the user. Otherwise, it comes back to the initial state. In state 1, we can accumulate the confidence obtained in the first gesture with the one of the second gesture. Finally, in the third case the gesture is not detected at all (confidence<T1) and the machine simply waits until the confidence is bigger than T1.

In one or more embodiments, in order to increase the accuracy of the system, one can leverage information such as the fact that the user is looking at the sensor (e.g., optical camera) when doing the gesture. This can be detected by detecting the face under a certain orientation/pose. This type of face detection is relatively accurate given the current technology, and can provide an additional evidence that the gesture has been made. Another source of information that can be exploited is the time of the day when the gesture is done, considering that people typically use the elevator at specific times (e.g., when entering/leaving work, or at lunch time, in a business environment). As discussed above, one might also ask the user to produce a characteristic sound while doing the gesture, for example snapping the fingers while doing the gesture. This sound can be recognized by the system if the sensor has an integrated microphone.

Figure 10:
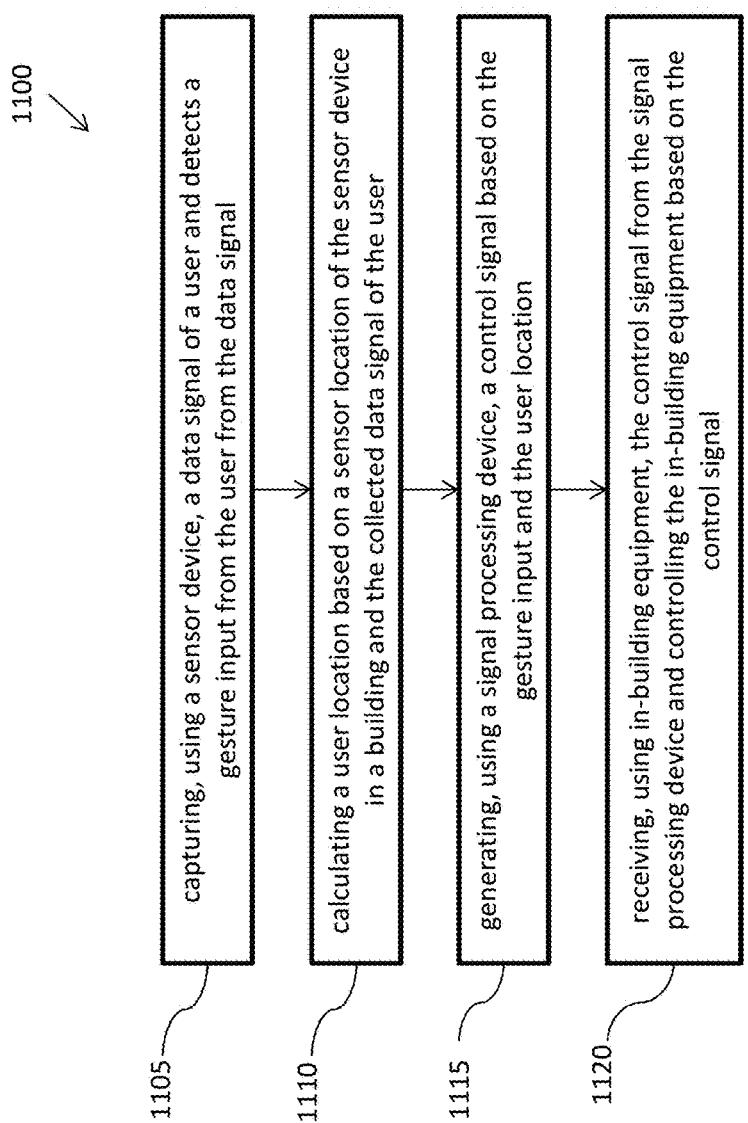
FIG. 10 is a flowchart of a method that includes gesture at a distance control in accordance with one or more embodiments.

FIG. 10 is a flowchart of a method 1100 that includes gesture at a distance control in accordance with one or more embodiments of the present disclosure. The method 1100 includes capturing, using a sensor device, a data signal of a user and detects a gesture input from the user from the data signal (operation 1105). Further, the method 1100 includes calculating a user location based on a sensor location of the sensor device in a building and the collected data signal of the user (operation 1110). The method 1100 goes on to include generating, using a signal processing device, a control signal based on the gesture input and the user location (operation 1115). Further, the method 1100 includes receiving, using in-building equipment, the control signal from the signal processing device and controlling the in-building equipment based on the control signal (operation 1120). According to another embodiment, the method can include receiving, using an elevator controller, the control signal from the signal processing device and controlling the one or more elevator cars based on the control signal.

In an alternative embodiment, sensors such as Passive Infrared (PIR) can be used instead of cameras. These sensors are usually deployed to estimate building occupancy, for example for HVAC applications. We can leverage the existing network of PIR sensors for detecting gestures made by the users. The PIR detect movement, and we can ask the user to move the hand in a characteristic way in front of the sensor.

In an additional embodiment, the elevator can be called by producing specific sounds (e.g., whistling three consecutive times, clapping, etc.) and in this case we can use a network of acoustic microphones across the building. Finally, as explained above, we can make a fusion of different sensors, by requiring the user to make a characteristic sound (e.g., whistling twice) while performing a gesture. By integrating multiple evidences we can increase significantly the accuracy of the system.

According to one or more embodiments, a gesture and location recognition system for controlling in-building equipment can be used a number of different way by a user. For example, according to one embodiment, a user walks up to a building and is picked up by a camera. The user then waves their hands, gets a flashing light acknowledging the hand waving gesture was recognized. The system then calculated an elevator arrival estimate as well as a user's elevator arrival. Based on these calculations the system, places an elevator call accordingly. Then the cameras placed throughout the building that are part of the system track the user through the building (entrance lobby, halls, etc.) to elevator. The tracking can be used to update the user arrival estimate and confirm the user is traveling the correct direction toward the elevators. Once the user arrives at the elevators, the elevator car that was requested will also arrive for the user.

According to another embodiment, a user can approach a building, is picked up by a building camera, but can decide to make no signal. The system will not generate any in-building equipment control signals. The system may continue tracking the user or it may not. The user can then later be picked in a lobby at which point the user gestures indicating a desire to user, for example, an elevator. The elevator system can chime an acknowledging signal, and the system will then call an elevator car for the user. Another embodiment includes a user that leaves an office on twentieth floor and a hall camera picks the user up. At this point the user makes a gesture, such as clapping their hands. The system detects this gesture and an elevator can be called with a calculated delay and acknowledgment sent. Further, cameras throughout the building can continue to track the user until the user walks into elevator.

Advantageously, embodiments described herein provide a system that allows users to call the elevator from distant parts of the building, contrary to current works that are designed to be used inside or close to the elevator. One or more embodiments disclosed here also allow one to call the elevator without carrying any extra equipment, just by gestures, contrary to works which require a mobile phone. One or more embodiments disclosed here also do not require the installation of hardware. One or more embodiments are able to leverage the existing network of sensors (e.g., CCTV optical cameras or depth sensors). Another benefit of one or more embodiments can include seamless remote summoning of an elevator without requiring users to have specific equipment (mobile phones, RFID tags, or other device) with automatic updating of a request. The tracking may not need additional equipment if an appropriate video security system is already installed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A gesture and location recognition system configured to support an elevator system, the gesture and location recognition system comprising:

a plurality of sensor devices each disposed in a respective sensor location in a building remote from the elevator system, wherein each sensor device of the plurality of sensor devices are configured to capture a data signal associated with a gesture input performed by a user, wherein a user location is calculated based on the sensor location of the associated sensor device that captures the data signal and;

a signal processing device in communication with the plurality of sensor devices, and configured to detect the gesture input from the data signal and generate an elevator call signal based on the gesture input and the user location, wherein the elevator system includes one or more elevator ears and one or more elevator controllers configured to receive the elevator call signal from the signal processing device and controls the one or more elevator cars based on the elevator call signal, and wherein the signal processing device estimates a travel time for the user to travel to an elevator lobby from the user location and adjusts the elevator call signal based on the estimated travel time to travel to the elevator lobby.

2. The gesture and location recognition system of claim 1, wherein the plurality of sensor devices include one or more of a 3D sensor, a 2D sensor, a motion sensor, a microphone or an array of microphones; a button or set of buttons; a switch or set of switches; a keyboard; a touchscreen; an RFID reader; a capacitive sensor; a wireless beacon sensor; a pressure sensitive floor mat, a gravity gradiometer, a camera, a depth sensor, and a mobile device tracking system.

3. The gesture and location recognition system of claim 1,
wherein the data signal includes at least one of a visual representation and a 3D depth map, and
wherein the data signal includes one or more of an image, a collection of images, a video, an animation, a cropped portion of an image, and a cropped portion of a video.

4. The gesture and location recognition system of claim 1,
wherein the gesture input can include at least one from a group consisting of an arm movement, a body movement, a finger movement, a head movement, a facial movement, moving an object, and a combination of movements.

5. The gesture and location recognition system of claim 1, further comprising tracking the user moving through the building as the user passes other sensors devices of the plurality of sensor devices and adjusting the estimated time to travel elevator lobby.

6. The gesture and location recognition system of claim 1, further comprising:
a mobile device of the user,
wherein the mobile device is one selected from a group consisting of a mobile phone, a beacon, an RFID tag, a tablet, and a wearable electronic, and
wherein the mobile device provides additional information and tracking ability to the signal processing device.

7. A method with gesture and location recognition, the method comprising:
capturing, using a sensor device, a data signal representative of a gesture input performed by a user;
detecting the gesture input from the data signal by a signal processing device,
calculating a user location by the signal processing device, and based on a sensor location of the sensor device in a building and the captured data signal;
generating, using the signal processing device, a control signal based on the gesture input and the user location;
estimating, using the signal processing device, a travel time for the user to travel to an elevator lobby for boarding the elevator car from the user location;
adjusting, using the signal processing device, the control signal based on the estimated travel time to travel to the elevator car, wherein the control signal is an elevator call signal;
receiving the control signal by an elevator controller of an elevator system and from the signal processing device; and
controlling an elevator car of the elevator system based on the control signal, wherein the sensor device is one of a network of sensor devices and the sensor location is one of a plurality of remote sensor locations with each sensor device located at a respective sensor location in a building containing the elevator system, and the plurality of remote locations are placed outside a normal interaction distance for calling the elevator car in an elevator lobby.

8. The method of claim 7, wherein the sensor device is at least one from a group consisting of a 3D sensor, a 2D sensor, a motion sensor, a microphone or an array of microphones, a button or set of buttons, a switch or set of switches, a keyboard, a touchscreen, an RFID reader, a capacitive sensor, a wireless beacon sensor, a pressure sensitive floor mat, a gravity gradiometer, a camera, a depth sensor, and a mobile device tracking system.

9. The method of claim 7,
wherein the data signal is at least one from a group consisting of a visual representation and a 3D depth map, and
wherein the visual representation is at least one from a group consisting of an image, a collection of images, a video, an animation, a cropped portion of an image, and a cropped portion of a video.

10. The method of claim 7,
wherein the gesture input includes at least one from a group consisting of an arm movement, a body movement, a finger movement, a head movement, a facial movement, moving an object, and a combination of movements.

11. The method of claim 7, further comprising:
providing additional information and tracking ability to the signal processing device using a mobile device of the user,
wherein the mobile device is one selected from a group consisting of a mobile phone, a beacon, an RFID tag, a tablet, a wireless computing device, and a wearable electronic.

* * * * *